United States Patent
Hong et al.

(10) Patent No.: US 9,642,053 B2
(45) Date of Patent: May 2, 2017

(54) METHODS, DEVICES, AND COMPUTER PROGRAM PRODUCTS IMPROVING MOBILE COMMUNICATION

(71) Applicant: AVAGO TECHNOLOGIES GENERAL IP (SINGAPORE) PTE. LTD., Singapore (SG)

(72) Inventors: Wei Hong, Beijing (CN); Na Wei, Beijing (CN); Erlin Zeng, Beijing (CN); Haiming Wang, Beijing (CN); Pengfei Sun, Beijing (CN)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 0 days.

(21) Appl. No.: 14/648,839

(22) PCT Filed: Dec. 28, 2012

(86) PCT No.: PCT/CN2012/087825
§ 371 (c)(1),
(2) Date: Jun. 1, 2015

(87) PCT Pub. No.: WO2014/101096
PCT Pub. Date: Jul. 3, 2014

(65) Prior Publication Data
US 2015/0304921 A1 Oct. 22, 2015

(51) Int. Cl.
*H04W 36/08* (2009.01)
*H04W 24/10* (2009.01)
(Continued)

(52) U.S. Cl.
CPC ........... *H04W 36/08* (2013.01); *H04W 24/10* (2013.01); *H04W 36/22* (2013.01); *H04W 36/30* (2013.01); *H04W 84/047* (2013.01)

(58) Field of Classification Search
CPC . H04W 36/08; H04W 36/0083; H04W 36/22; H04W 24/10; H04W 36/30
(Continued)

(56) References Cited

U.S. PATENT DOCUMENTS 7,924,785 B2 * 4/2011 Shaheen ........... H04W 36/0061
370/331
8,355,729 B2 1/2013 Li et al.
(Continued)

FOREIGN PATENT DOCUMENTS

CN 101237685 8/2008
CN 101772113 7/2010
(Continued)

*Primary Examiner* — William Nealon
(74) *Attorney, Agent, or Firm* — Oblon, McClelland, Maier & Neustadt, L.L.P.

(57) ABSTRACT

The present invention relates to devices, methods and computer program products concerning a communication link in, for example, a so-called unlicensed band. The invention proposes an apparatus, comprising: a control module configured to control a transceiver being controllable to use at least one of at least two transmission resources for communication with a respective other apparatus, wherein a first transmission resource is useable for a direct communication with another apparatus of a first type and a second transmission resource is useable for a communication with one of plural other apparatuses of a second type each linked to the other apparatus of the first type, determine whether communication is setup via one of the plural other apparatuses of the second type, and, in response thereto, obtain information for deciding to switch the communication to another one of the apparatuses of the second type, evaluate the information obtained, and, cause to decide to switch the communication to one other apparatus of the second type.

18 Claims, 9 Drawing Sheets

(51) Int. Cl.
*H04W 36/22* (2009.01)
*H04W 36/30* (2009.01)
*H04W 84/04* (2009.01)

(58) Field of Classification Search
USPC .......................................................... 455/436
See application file for complete search history.

(56) References Cited

U.S. PATENT DOCUMENTS

| | | | | |
|---|---|---|---|---|
| 2002/0039367 | A1* | 4/2002 | Seppala | H04W 8/065 |
| | | | | 370/401 |
| 2005/0107110 | A1* | 5/2005 | Vasudevan | H04W 36/34 |
| | | | | 455/525 |
| 2008/0192697 | A1* | 8/2008 | Shaheen | H04W 36/0061 |
| | | | | 370/331 |
| 2009/0279504 | A1* | 11/2009 | Chin | H04W 36/0083 |
| | | | | 370/331 |
| 2011/0105120 | A1* | 5/2011 | Abdel-Samad | H04W 48/16 |
| | | | | 455/436 |
| 2011/0194530 | A1* | 8/2011 | Tinnakornsrisuphap | ................ |
| | | | | H04W 36/04 |
| | | | | 370/331 |
| 2012/0309394 | A1* | 12/2012 | Radulescu | H04W 36/0055 |
| | | | | 455/436 |

FOREIGN PATENT DOCUMENTS

| | | |
|---|---|---|
| CN | 102164385 | 8/2011 |
| CN | 102572973 | 7/2012 |

\* cited by examiner

METHODS, DEVICES, AND COMPUTER PROGRAM PRODUCTS IMPROVING MOBILE COMMUNICATION

FIELD OF THE INVENTION

The present invention relates to devices, methods and computer program products in relation to mobile communication. In particular, it relates to those devices, methods and computer program products concerning a communication link in, for example, a so-called unlicensed band.

BACKGROUND

Mobile communication architectures can be categorized as cellular network and ad-hoc network. In a cellular network such as Long Term Evolution (LTE), LTE-Advanced (LTE_A), Universal Mobile Telecommunications System (UMTS), Global System for Mobile Communications (GSM), or the like, communication between mobile devices is routed via one or more core network elements via preferably a so-called licensed band.

Mobile communication architectures can be categorized as cellular networks using a licensed band and ad-hoc networks using an unlicensed bad. In a cellular network, direct communication between mobile devices is usually not permitted. Traffic is generally routed via one or more core network elements. Contrary, in ad-hoc networks, mobile devices can communicate directly with each other without involving a (core) network infrastructure such as a centralized controller. This is referred to as device-to-device (D2D) or peer-to-peer (P2P) communication.

Enabling additional D2D communications in cellular networks was found to potentially become a promising concept. According to such concept, local D2D communication benefits from the centralized controlling of cellular system such as resource allocation and interference coordination. Also, the efficiency of a cellular system can be improved by exploiting channels of high quality for short-range D2D links.

In some local e. g. rural arrangements, the communication traffic may reach the limit of the network resulting in losses of information, quality deficiencies, or the like.

Hence, it is an object of the invention to improve such systems.

SUMMARY

According to a first (e. g. terminal-apparatus-related) aspect of the invention, there is provided an apparatus, comprising: a control module configured to control a transceiver being controllable to use at least one of at least two transmission resources for communication with a respective other apparatus, wherein a first transmission resource is useable for a direct communication with another apparatus of a first type and a second transmission resource is useable for a communication with one of plural other apparatuses of a second type each linked to the other apparatus of the first type, determine whether communication is setup via one of the plural other apparatuses of the second type, and, in response thereto, obtain information for deciding to switch the communication to another one of the apparatuses of the second type, evaluate the information obtained, and, cause to decide to switch the communication to one other apparatus of the second type.

According to a second (e. g. network-apparatus-related) aspect of the invention, there is provided 9. An apparatus, comprising: a control module configured to control a transceiver being controllable to use one of at least two transmission resources for communication with a respective other apparatus, wherein a first transmission resource is useable for a direct communication with another apparatus of a first type and a second transmission resource is useable for a communication with the apparatus of the first type by one of plural other apparatuses of a second type each linked to the apparatus, determine whether communication is setup via one of the plural other apparatuses of the second type, and, transmit a configuration to the other apparatus of the first type, the configuration requesting the apparatus of the first type to report evaluated information obtained for deciding to switch the communication to another one of the apparatuses of the second type to the apparatus, decide to switch the communication to one other apparatus of the second type, and cause to transmit the decision to the apparatus of the first type in order to switch the communication to one other apparatus of the second type.

According to a third (e. g. terminal-method-related) aspect, a method, comprising: controlling a transceiver being controllable to use at least one of at least two transmission resources for communication with a respective other apparatus, wherein a first transmission resource is useable for a direct communication with another apparatus of a first type and a second transmission resource is useable for a communication with one of plural other apparatuses of a second type each linked to the other apparatus of the first type, determining whether communication is setup via one of the plural other apparatuses of the second type, and, in response thereto, obtaining information for deciding to switch the communication to another one of the apparatuses of the second type, evaluating the information obtained, and, causing to decide to switch the communication to one other apparatus of the second type.

According to a fourth (e. g. network-method-related) aspect, a method, comprising: controlling a transceiver being controllable to use one of at least two transmission resources for communication with a respective other apparatus, wherein a first transmission resource is useable for a direct communication with another apparatus of a first type and a second transmission resource is useable for a communication with the apparatus of the first type by one of plural other apparatuses of a second type each linked to the apparatus, determining whether communication is setup via one of the plural other apparatuses of the second type, and, transmitting a configuration to the other apparatus of the first type, the configuration requesting the apparatus of the first type to report evaluated information obtained for deciding to switch the communication to another one of the apparatuses of the second type to the apparatus, deciding to switch the communication to one other apparatus of the second type, and causing to transmit the decision to the apparatus of the first type in order to switch the communication to one other apparatus of the second type.

According to a fifth aspect of the present invention, there are provided one or more computer program product(s) comprising computer-executable components which, when the program is run on a computer, are configured to carry out the respective method(s) as referred herein above.

The above computer program product may further comprise computer-executable components which, when the program is run on a computer, perform the method aspects mentioned above in connection with the method aspects.

The above computer program product/products may be embodied as a computer-readable storage medium.

Various further aspects of at least some exemplary embodiments of the aspects of the invention are set out in the respective dependent claims.

BRIEF DESCRIPTION OF THE DRAWINGS

The teachings of the present invention can be readily understood and at least some additional specific details will appear by considering the following detailed description of at least some exemplary embodiments in conjunction with the accompanying drawings, in which.

DETAILED DESCRIPTION OF THE EMBODIMENTS

Figure 1:
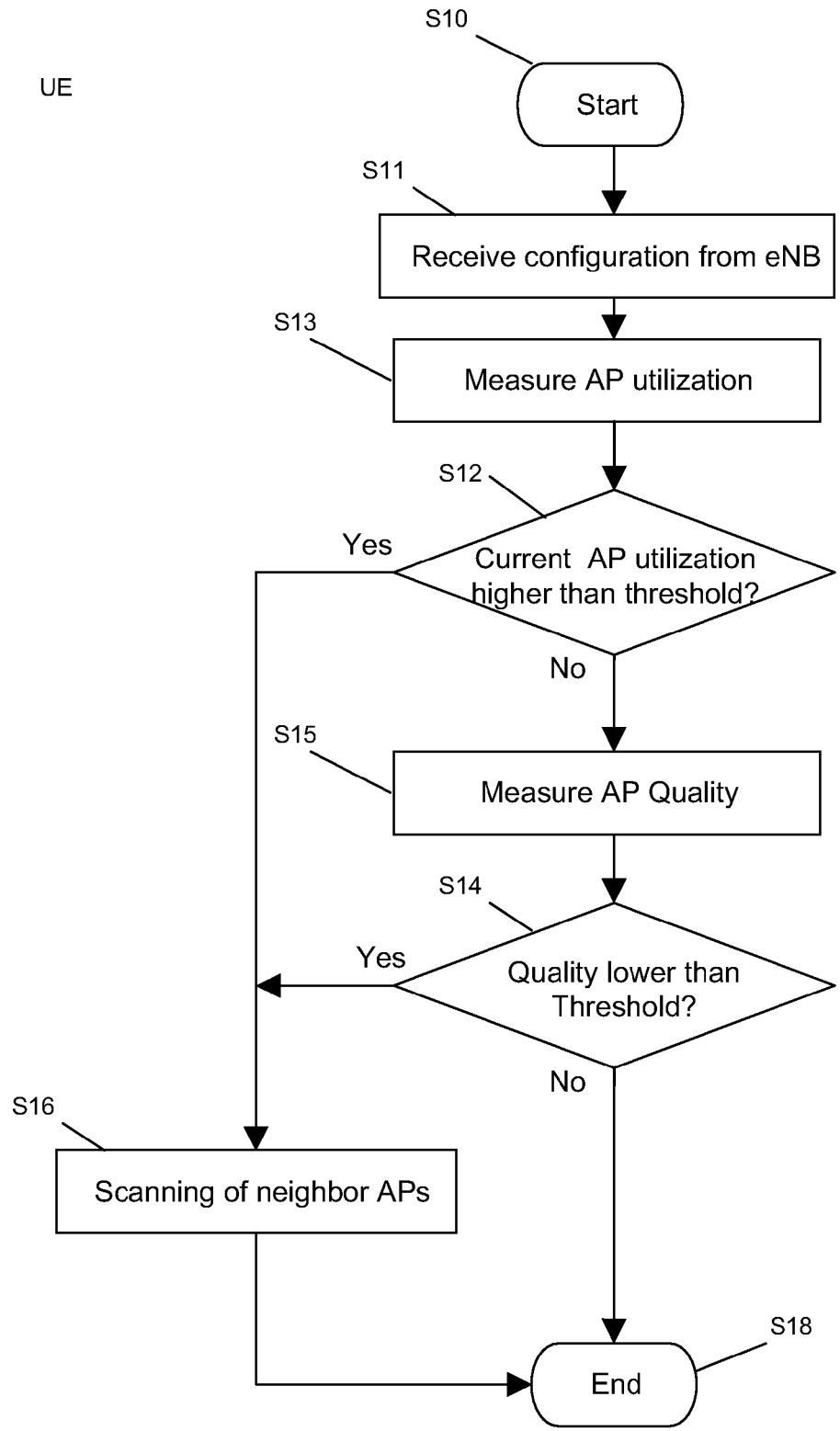
FIG. 1 depicts schematically a flow chart for an operation executed by a terminal apparatus according to an exemplary embodiment of the invention.

Generally, references to certain standards, media and/or resources in this description are rather supposed to be exemplary for the purpose of illustration in order to improve the ease of understanding of the invention. They are not to be understood as limiting the inventive concept. Likewise, the language as well as terms used herein such as e. g. signal names, device names and the like, are to demonstrate the embodiments only. Use of such language or terms apart from their understanding according to this disclosure shall not be applied to the invention for the purpose of limiting its scope.

Although wireless communication is usually established via radio as a transmission resource, it may also be applied to ultrasonic, infrared light or the like as transmission resource.

Herein below, however, exemplary aspects of the invention will be described with reference to radio communication as wireless communication medium.

Embodiments of the present invention may be implemented in software, hardware, application logic or a combination of software, hardware and application logic. The software, application logic and/or hardware generally reside on control modules of terminal devices or network devices.

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

The present invention can advantageously be implemented in user equipments or smart phones, or personal computers connectable to such networks. That is, it can be implemented as/in chipsets to connected devices, and/or modems thereof. Generally, mobile devices may be a user equipment (UE) such as cellular phones, smart phones, laptop's, handhelds, tablets, vehicles, or the like.

Generally, the invention pertains to centralized wireless networking over transmission resources. A transmission resource is a transmission medium or a portion thereof, which is capable of transmitting information, such as radio, ultrasonic, light, e. g. infrared light, or the like. Especially, the invention pertains to centralized wireless networking over licensed bands and unlicensed bands such as ISM bands as well, preferably, combined with an additional ability of networking over ISM bands as unlicensed bands.

Although wireless communication is usually established via radio as a transmission resource, in further embodiments, it is applied to ultrasonic, infrared light or the like as transmission resource. The transmission resource may be limited to a certain band or divided in certain bands, wherein a band defines a wavelength range or a frequency range, respectively. Herein below, however, exemplary aspects of the invention will be described with reference to radio communication as wireless communication.

Devices such as mobile devices can communicate via a centralized control unit, such as an eNB or the like, at least partially routing the communication between two or more devices, preferably terminal devices such as user equipments or the like. The centralized control unit is preferably part of the core network infrastructure. Especially, the centralized control unit is usually aware of those devices which are in a communication range with the centralized control unit. The devices need not be mobile. They can also be stationary. In one exemplary embodiment, they are user equipments such as cellular phones, smart phones, laptop's, or the like.

The ISM (industrial, scientific and medical) radio bands are license-exempt bands or unlicensed bands, respectively, which were originally reserved internationally for the use of radio frequency (RF) energy for industrial, scientific and medical purposes other than communications. However, in recent years these bands have also been shared with license-free error-tolerant communications applications such as Wireless LANs (WLAN) and cordless phones in the 915 MHz, 2.450 GHz, and 5.800 GHz bands. A main usage on these ISM bands is so called WiFi™.

WiFi™ is not a technical term. However, the WIFi™ Alliance has generally enforced its use to describe only a narrow range of connectivity technologies including wireless local area network (WLAN) based on the IEEE 802.11, which is a set of standards carrying out WLAN communication in the 2.4, 3.6 and 5 GHz frequency bands.

ISM band 2.4 GHz (WiFi 802.11b and 802.11g/n)

ISM band 5 GHz (WiFi 802.11a/n/ac)

Recent growth in data traffic driven by mobile applications on smart phone devices, tablets, etc. has continued to strain the capacity of today's networks. Therefore, network operators are increasingly utilizing unlicensed WiFi™ spectrum to cope with such network congestion, and this trend is expected to accelerate further as traffic demand continues to grow.

Use of unlicensed spectrum is a cost-effective means to add the needed capacity of today's networks, given the limited availability and high cost of licensed spectrum. WLAN may be integrated as a separate access network to the 3GPP EPC. This requires extra cost of deploying the complete WLAN access network and also impacts the 3GPP core network entities. WiFi™ offload solutions can be based on this deployment model of distinct 3GPP and WLAN access networks using a common core with selective switching of flows based on operator/user policies.

It is proposed to involve extending the same design principles already defined for carrier aggregation to support aggregation/coordination of cells/carriers across Wide and Local Area Networks as well.

According to exemplary, e. g. terminal-related, embodiment of the invention, there is provided an apparatus, comprising: a control module configured to control a transceiver being controllable to use at least one of two transmission resources for communication with a respective other apparatus, wherein a first transmission resource is useable for a direct communication with another apparatus of a first type and a second transmission resource is useable for a communication with one of plural other apparatuses of a second type each linked to the other apparatus of the first type, determine whether communication is setup via one of the plural other apparatuses of the second type, and, in response thereto, obtain information for deciding to switch the communication to another one of the apparatuses of the second type, evaluate the information obtained, and, cause to decide to switch the communication to one other apparatus of the second type. The apparatus can be a terminal device such as a user equipment or a portion thereof. The apparatus can be integral with the transmitter or form a separate component. The apparatus of the second type may be formed by an access unit such as an access point or the like using the second transmission resource. Preferably, the access unit is communicatively connected with the apparatus of the first type, which, in turn, may be formed by a network apparatus such as a eNB or the like.

According to an additional embodiment, the decision to switch the communication to one other apparatus of the second type is caused by the control module of the apparatus in an autonomous mode. The terminal device may measure and decide to switch its communication between apparatuses of the second type independently. So, in an exemplary embodiment where the apparatus is part of a terminal device such as a user equipment, the apparatus decides which apparatus of the second type, such as an access unit or an access point, respectively, it communicates with. Switching is preferably performed for the second resource.

Yet another supplemental embodiment teaches that the control module is configured to, in a non-autonomous mode, report the information obtained to the apparatus of the first type, and receive a decision to switch the communication to one other apparatus of the second type from the apparatus of the first type in order to cause to decide to switch the communication to one other apparatus of the second type. So, in an exemplary embodiment where the apparatus is part of a terminal device such as a user equipment, the apparatus executes an external decision for switching which apparatus of the second type, such as an access unit or an access point, respectively, it communicates with. Switching is preferably performed for the second resource. In this non-autonomous mode, decision for switching is made by the apparatus of the first type, that is, e. g. the network apparatus such as the eNB, or the like.

One other exemplary embodiment teaches that the control module is further configured to, in order to obtain information, cause measuring of an operational parameter of the other apparatuses of the second type which are in a communication range. So, the apparatus can be enabled to receive operational parameters such as signal strength, utilization, communication quality, and the like which are preferably useable to perform the decision to switch.

According to a further exemplary embodiment, the control module is configured to receive a configuration indicative of at least the autonomous mode or the non-autonomous mode. The configuration includes preferably an information element that allows determining the mode to operate. Further, the configuration includes a new measurement object.

Another exemplary embodiment recites that the control module is configured to cause to report respective operational parameters measured to the other apparatus of the first type. So, the apparatus of the first can be enabled to decide to switch. The report is preferably provided by a new report object, which preferably, is included in the configuration.

According to a further exemplary embodiment, the control module is configured to report switching the communication to the other apparatus of the second type to the apparatus of the first type. So, the apparatus of the first type can be informed about the switch condition even if the apparatus is in the autonomous mode.

Yet another exemplary embodiment recites that the configuration comprises at least one of an address of the apparatus of the second type, a beacon information, a measurement configuration for the second resource, a signal strength threshold of the apparatus of the second type, a utilization threshold of the apparatus of the second type, offset, and an identification signaling of the apparatus of the second type. Various additional parameters and combinations thereof can be provided in order to adapt the switch condition individually.

According to an exemplary, e. g. network-related embodiment of the invention, an apparatus is provided, comprising: a control module configured to control a transceiver being controllable to use at least one of at least two transmission resources for communication with a respective other apparatus, wherein a first transmission resource is useable for a direct communication with another apparatus of a first type and a second transmission resource is useable for a communication with the apparatus of the first type by one of plural other apparatuses of a second type each linked to the apparatus, determine whether communication is setup via one of the plural other apparatuses of the second type, and, transmit a configuration to the other apparatus of the first type, the configuration requesting the apparatus of the first type to report evaluated information obtained for deciding to switch the communication to another one of the apparatuses of the second type to the apparatus, decide to switch the communication to one other apparatus of the second type, and cause to transmit the decision to the apparatus of the first type in order to switch the communication to one other apparatus of the second type. The apparatus can be a network apparatus such as a eNB or the like. The apparatus of a first type can be a terminal apparatus such as a user equipment or the like. The apparatus of the second type may be formed by an access unit such as an access point or the like using the second transmission resource. Preferably, the access unit is communicatively connected with the apparatus of the first type. The apparatus controls switching communication of the apparatus of the first type to different apparatuses of the second type.

According to one exemplary embodiment, the control module is configured to cause to transmit a new configuration comprising the decision. In an exemplary embodiment, the decision is sent from the apparatus such as a network apparatus, e. g. an eNB, or the like to an apparatus of the first type such as a terminal apparatus, e. g. a user equipment, or the like. The configuration includes preferably an information element that allows determining the mode to operate. In an exemplary embodiment, the mode to operate is sent from the apparatus such as a network apparatus, e. g. an eNB, or the like to an apparatus of the first type such as a terminal apparatus, e. g. a user equipment, or the like. Further, the configuration includes a new measurement object. In an exemplary embodiment, the measurement object is sent from the apparatus such as a network apparatus, e. g. an eNB, or the like to an apparatus of the first type such as a terminal apparatus, e. g. a user equipment, or the like.

Yet another exemplary embodiment provides for the configuration comprising at least one of an address of the apparatus of the second type, a beacon information, a measurement configuration for the second resource, a signal strength threshold of the apparatus of the second type, a utilization threshold of the apparatus of the second type, offset, and an identification signaling of the apparatus of the second type. So, the apparatus of the first type receives necessary information related to switching of the communication between apparatuses of the second type.

One exemplary embodiment teaches that the control module is configured to control the transmitter to setup communication using one of the transmission resources associated to the respective apparatus of the corresponding type.

The invention is now further detailed by further embodiments and the accompanying drawings.

Figure 5:
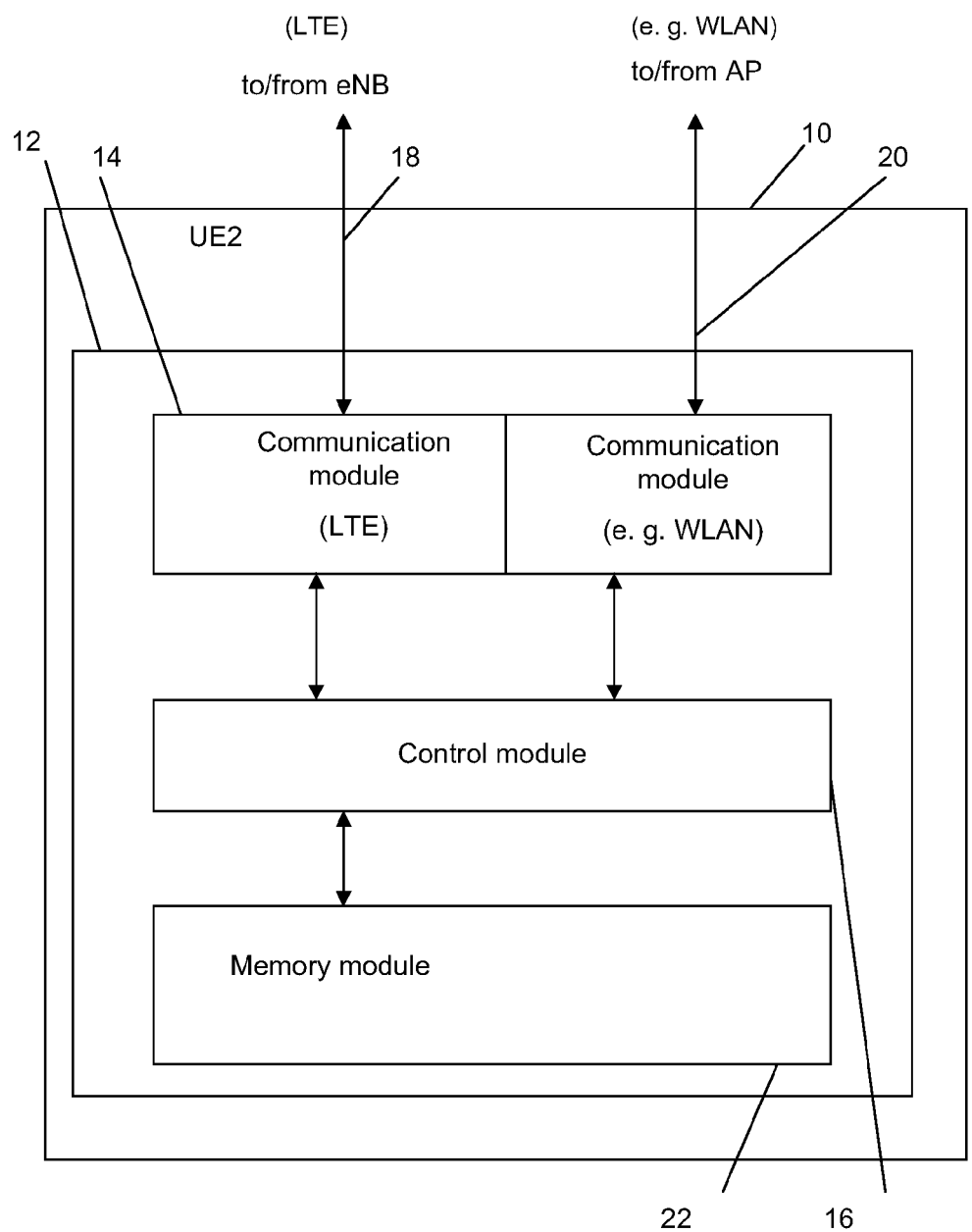
FIG. 5 schematically shows a block circuit diagram of a user equipment containing an apparatus according to at least one exemplary aspect of the invention.
Figure 6:
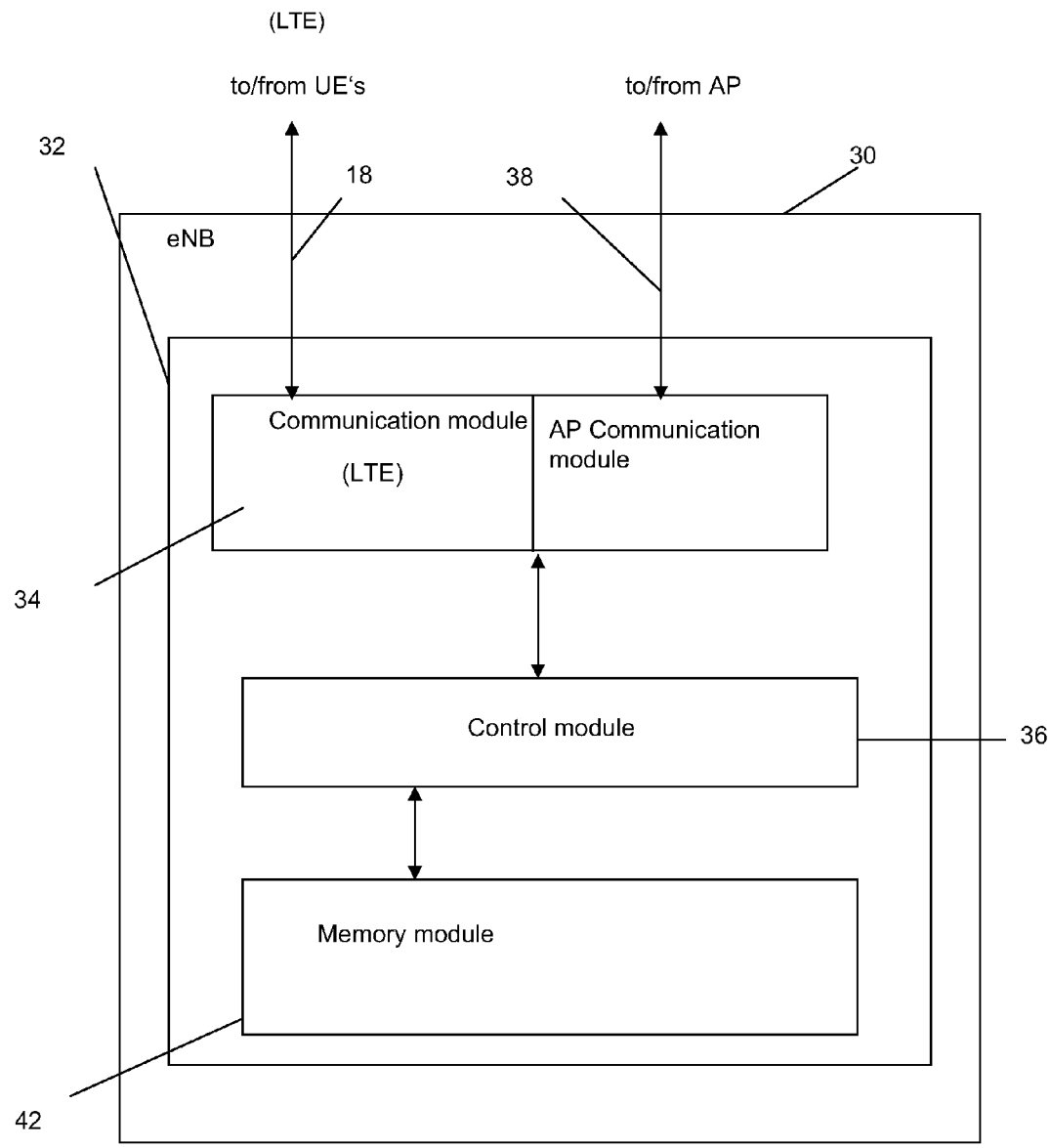
FIG. 6 schematically depicts a block circuit diagram of a centralized control unit such as an eNB or a HeNB according to at least one exemplary aspect of the invention.
Figure 7:
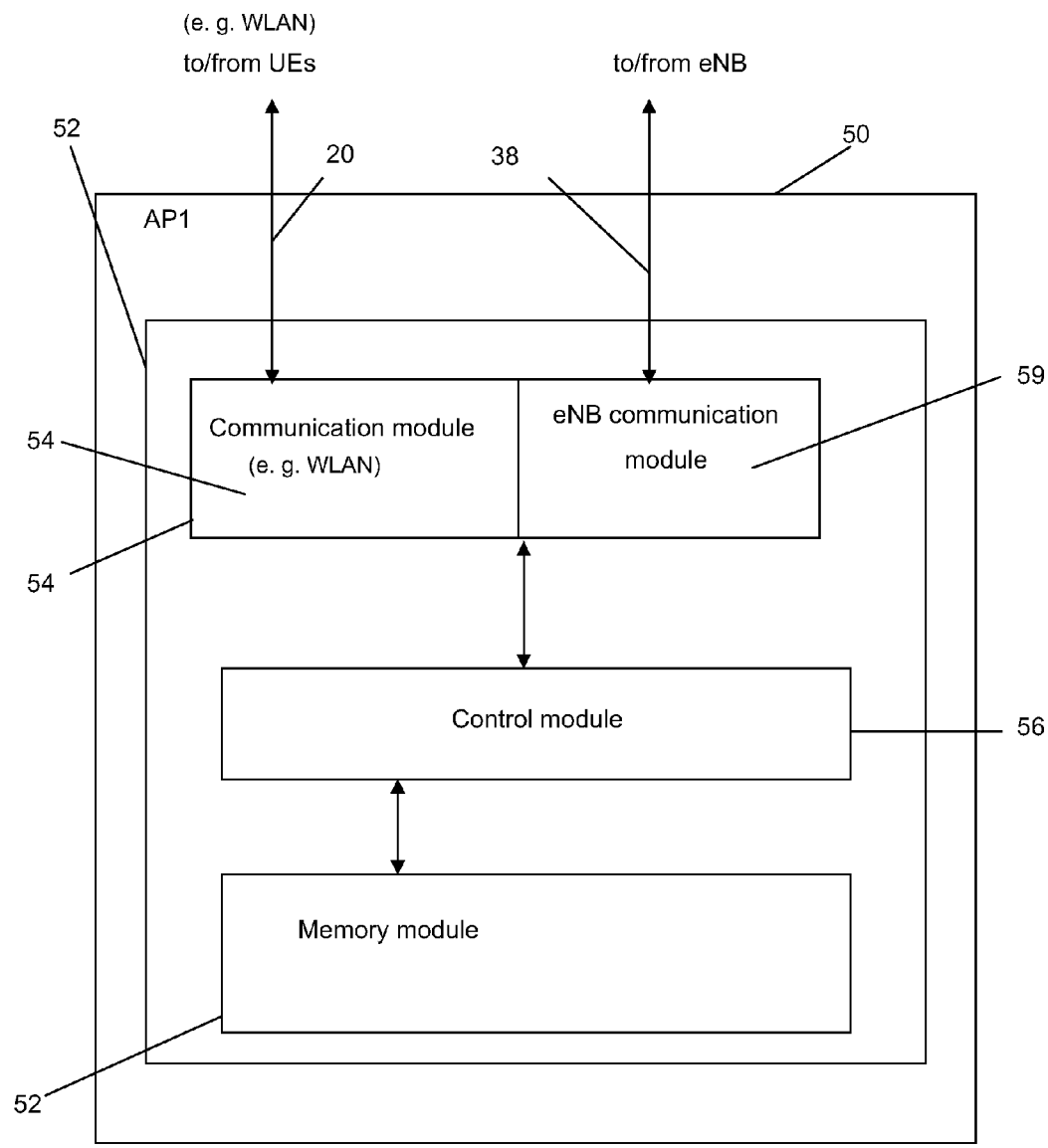
FIG. 7 schematically depicts a block circuit diagram of an access point according to an exemplary aspect of the invention.

FIGS. 5 to 7 show block circuit diagrams of devices suitable for use in relation to at least one exemplary embodiment of the invention.

FIG. 6 shows a block circuit diagram of an eNB 30 as a centralized control unit or network device, respectively, being provided with a network apparatus 32. The network apparatus 32 comprises a control module 36 being configured to control a transceiver 34 which is enabled to communicate using one transmission resource, namely, a first resource 18 which is useable for communicating with terminal devices such as the terminal device 10 as discussed later on, or preferably terminal apparatuses, such as the terminal apparatus 12 as also described later on, via, preferably exclusively, radio according to the LTE, the LTE-A standard, the UMTS standard, combinations thereof, or the like. The first resource 18 may be used for centralized networking. Moreover, the transceiver 34 is further configured to be in a communication link with access units such as access points AP1, AP2, AP3 as described later on. This communication can be wire-bound, wireless, or a combination thereof and is preferably fixedly allocated to each access unit. In this embodiment, via wire-bound communication link 38 is provided to the access unit.

For the purpose of controlling the transceiver 34, various modules or units, respectively, can be provided in the control module 36 such as a processor receiving data from and transmitting data to the transceiver 34, e. g. via a communication link between the transceiver 34 and the control module 36. The transceiver 34 can be realized by a receiver combined with a transmitter suited for radio communication (or generally wireless). Both components may also be integral with each other. The transceiver 34 can include one or more antennas. However, if the communication between the devices is not radio based, the transmitter may be adapted to communicate via a different medium such as infrared light, ultrasonic, or the like. Signals received by the transceiver 34 are submitted to the control module 36. Likewise, signals to be transmitted or broadcast are submitted from the control module 36 to the transceiver 34. The transceiver 34 may be integral with the apparatus 32 as shown in FIG. 6 but it may also be located in the device 30 externally of apparatus 32 and thus need not form part of the apparatus 42. However, if the communication between the devices is not radio based, the transmitter may be adapted to communicate via a different medium such as infrared light, ultrasonic, or the like. According to one exemplary embodiment, the transceiver 34 is additionally configured to furnish an interface so that a communication link to at least one access unit can be provided. The communication link can use a wire-bound transmission resource such as cable or the like, or wireless such as point-to-point radio, point-to-point light, combinations thereof, or the like.

The apparatus 32 may further comprise the memory module 42 for storing data. The memory module 42 is connected with the control module 36 via a communication link. The memory module 42 can also be external from the apparatus 32 mentioned before and thus not form part of the apparatus 42.

The access unit is a component which communicates with the network device 30, preferably in a condition, where it is permanently connected with the network device 30. An exemplary embodiment of an access unit is schematically shown in FIG. 7 as access point AP1. The access point AP1 an access point device 50 including an access point apparatus 52. The access point apparatus 52 has a transmitter 54 that includes two portions, namely, a communication module 58 as a first portion that is adapted to communicate wireless with user equipments UE via radio using the second resource 20 which is in this embodiment radio via an ISM band, preferably WLAN. Moreover, the transmitter 54 includes an eNB communication module 59 as a second portion which is, in this embodiment, adapted to communicate with a connected eNB such as the ENB 30, via wire-bound communication link 38. So, the access point 50 is in permanent communication connection with the eNB 30. However, the communication connection can also be intermittent so that it is in communication e. g. only if communication traffic is present. Consequently, the access unit provides for a wireless relay service for user equipments to be connected with the network device 30. The transceiver 54 is controlled by a control module 56 that may be realized by a processing unit, a hardware circuitry, combinations thereof, or the like. Preferably, the control module 56 controls the transceiver 54 such that a relay function can be established so that a user equipment UE communicating via the transmission resource 20 with the access point AP1 is in communication connection with a network device 30 such that the eNB 30 which is communicating with the access point AP1 via the communication connection 38. This results in the user equipment UE being connected with the eNB 30 via the access unit 50, namely the access point AP1 in this embodiment. So, the access unit provides for a relay service.

FIG. 5 shows a block circuit diagram of a user equipment UE2 such as a terminal device 10 that may be realized as a cellular phone, Smartphone or the like. The terminal device 10 includes a terminal apparatus 12 comprising a control module 16 configured to control a transceiver 14 which is enabled to communicate using the at least two transmission resources 18, 20. For this purpose various modules can be provided in the control module 16 such as a processor receiving data from and transmitting data to the transceiver 14, e. g. via a communication link between the transceiver 14 and the control module 16. The transceiver 14 can be realized by a receiver combined with a transmitter suited for radio communication, or, more general, wireless. Both components may also be integral with each other. In an exemplary embodiment, the transceiver 14 includes one or more antennae. However, if the communication between the devices is not radio based, the transmitter may be adapted to communicate via a different medium such as infrared light, ultrasonic, or the like. Signals received by the transceiver 14 are submitted to the control module 16. Likewise, signals to be transmitted or broadcast are submitted from the control module 16 to the transceiver 14. The transceiver 14 may be integral with the apparatus 12 as shown in FIG. 5 but it may also be located in the device 10 externally of apparatus 12.

The apparatus 12 may comprise a memory module 22 as shown in FIG. 5. The memory module 22 can be connected with the control module 16 via a communication link. Preferably, the memory module 22 stores data. The memory module 22 can also be external from the apparatus 12 and thus not form part of the apparatus 12.

The transmitter modules 14 and 34 are preferably configured to establish communication via the first resource 18. Moreover, the transmitter modules 14 and 54 are preferably configured to establish communication via the second resource 20 as well. Additionally, the transmitter modules 34 and 54 are preferably configured to establish communication via a communication line 38 which can be a communication cable, a point-to-point wireless link such as a point-to-point radio link, combinations thereof, or the like.

Different communications via the transmission resource 18 and the combination of the transmission resource 20 with the communication line 38 can be simultaneous. It may also be provided that only one of the both resources can be used at time or in an alternating manner, respectively. The use may further depend on the traffic which present on the transmission resources.

Figure 4:
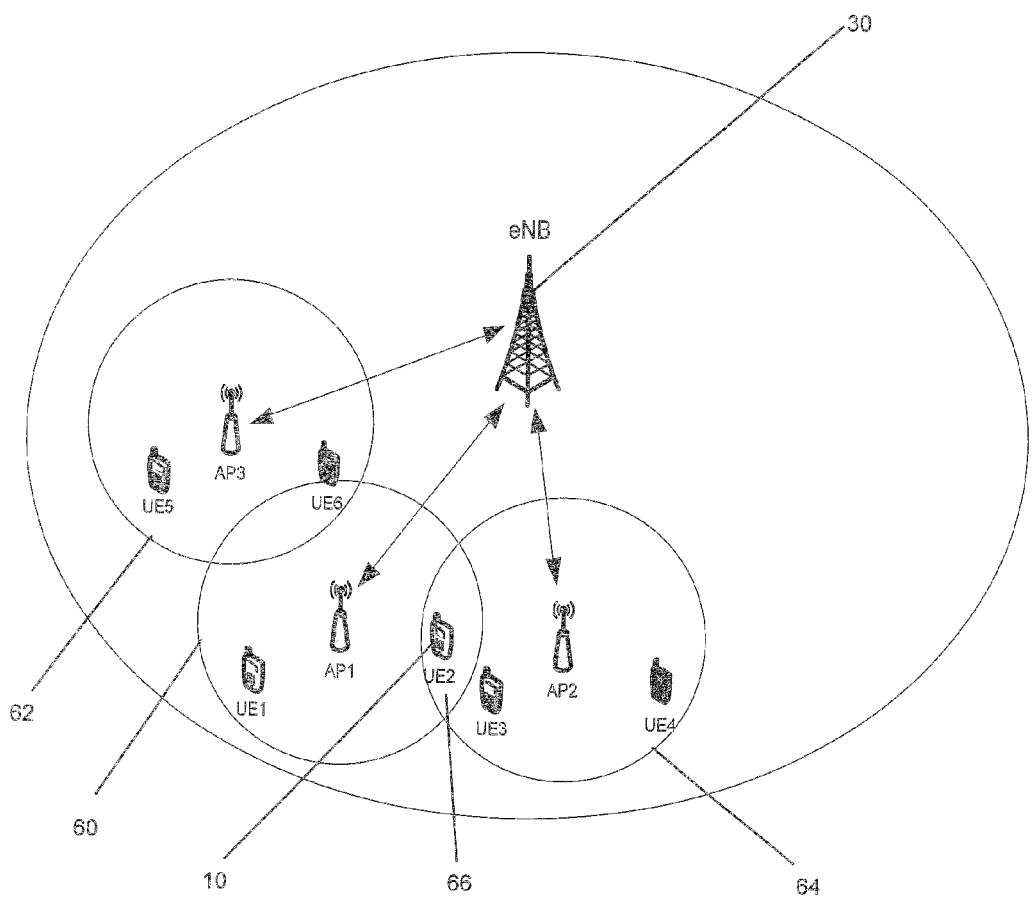
FIG. 4 depicts an schematically arrangement of an eNB, several access points and user equipments in an exemplary embodiment.

FIG. 4 shows schematically an arrangement for centralized networking between a network device 30, an eNB, and several user equipments UE1 to UE6. As can be derived from FIG. 4, there are provided three access units, namely, the access points AP1, AP2, and AP3 which are, according to an exemplary embodiment, such as detailed in FIG. 7 and the corresponding description. The access points AP1, AP2, and AP3 have respective communication ranges 60, 62, 64 so that they can communicate with user equipments UE located inside their respective communication ranges radio in an unlicensed radio band such as an ISM band, especially, WLAN, or the like which has a limited communication range as a second resource. So, the user equipments UE1 and UE2 are located in the communication range 60 of the access point AP1, the user equipments UE2, UE3, and UE4 are located in the communication range 64 of the access point AP2, and the user equipments UE5 and UE6 are located in the communication range 62 of the access point AP3. As also apparent from FIG. 4, the communication ranges 60 and 62 overlap, and also the communication ranges 60 and 64 do. In the overlapping portion 66 of the communication ranges 60 and 64, there is located the user equipment UE2. Therefore, the user equipment UE2 has the possibility to establish a communication link to the access point AP1 as to the access point AP2 as well. Moreover, each access point AP1, AP2, AP3 is communicatively linked to the network device 30. In this embodiment, the access points AP1, AP2, AP3 are connected with the terminal device 30 via a communication cable so as to establish a permanent communication link to the terminal device 30. According to an exemplary embodiment, the access points AP1, AP2, and AP3 operate as a relay station so that each of the user equipments UE1 to UE6 communicatively linked to the access points AP1, AP2, and AP3 is in turn communicatively connected with the network device 30. Additionally, the user equipments UE1 to UE6 are configured to communicate directly with the network device 30 via a first transmission resource, a licensed band.

Turning now to FIG. 1, showing a schematic flow chart illustrating operation of a user equipment UE, such as the user equipment UE2 described in relation to FIG. 5, according to an exemplary embodiment of the invention. The illustrated process for operating the user equipment UE starts at step S10. In this step S10, the user equipment UE is already communicating with a network device 30 or apparatus, respectively, via an access unit such as the user equipment UE2 and the access point AP1 according the embodiment of FIG. 4. At step S11, the UE receives configuration from the eNB. The configuration is a RRCConnectionReconfiguration which may configure the UE for autonomous access point (AP) re-selection/handover parameters such as access point (AP) utilization threshold, access point (AP) signal strength threshold, offsets, SSID, combinations thereof and the like. In an alternate exemplary embodiment, the configuration is a RRCConnectionReconfiguration which configures the UE for network-controlled access point (AP) re-selection/handover, wherein the RRCConnectionReconfiguration may include access point's (AP) address, e. g. AP1's address, beacon information and also measurement configuration for WiFi including e. g. new measObject802.11 and new ReportConfig802.11, and the like.

The process proceeds with step S13, wherein the utilization of the access point is measured. According to one embodiment, a channel utilization field is defined as the percentage of time, normalized to 255, the access point (AP) sensed the medium was busy, as indicated by either the physical or virtual carrier sense (CS) mechanism. This percentage is computed using the formula, ((channel busy time/(dot11ChannelUtilizationBeaconIntervals* dot11BeaconPeriod*1024))*255).

The process continues at step S12 by determining whether the current access point utilization is higher than a threshold, namely, an access point utilization threshold. The threshold is preferably set by the network device such as the network device 30, the eNB, preferably by the RRCConnectionReconfiguration mentioned above. Applied to the embodiment of FIG. 4, when the user equipment UE2 is already connected to the access point AP1, it is determined whether the AP1 access point utilization is higher than the threshold. If no, the process proceeds with step S15.

At step S15, the quality of the communication of the serving access point is measured. Then the process continues with step S14. At step S14, it is determined whether the quality is lower than a threshold, that is, the link quality of the serving access unit, such as the access point AP1 in the embodiment of FIG. 4, is lower than the threshold. If no, the process ends at step S18.

If yes, at step S12 or step S14, the user equipment UE performs scanning of neighboring access units, such as the access point AP2 of the embodiment of FIG. 4. After having performed scanning, the process ends at step S18. The user equipment UE is now aware of alternative possibilities for providing communication links for further decision.

Figure 2:
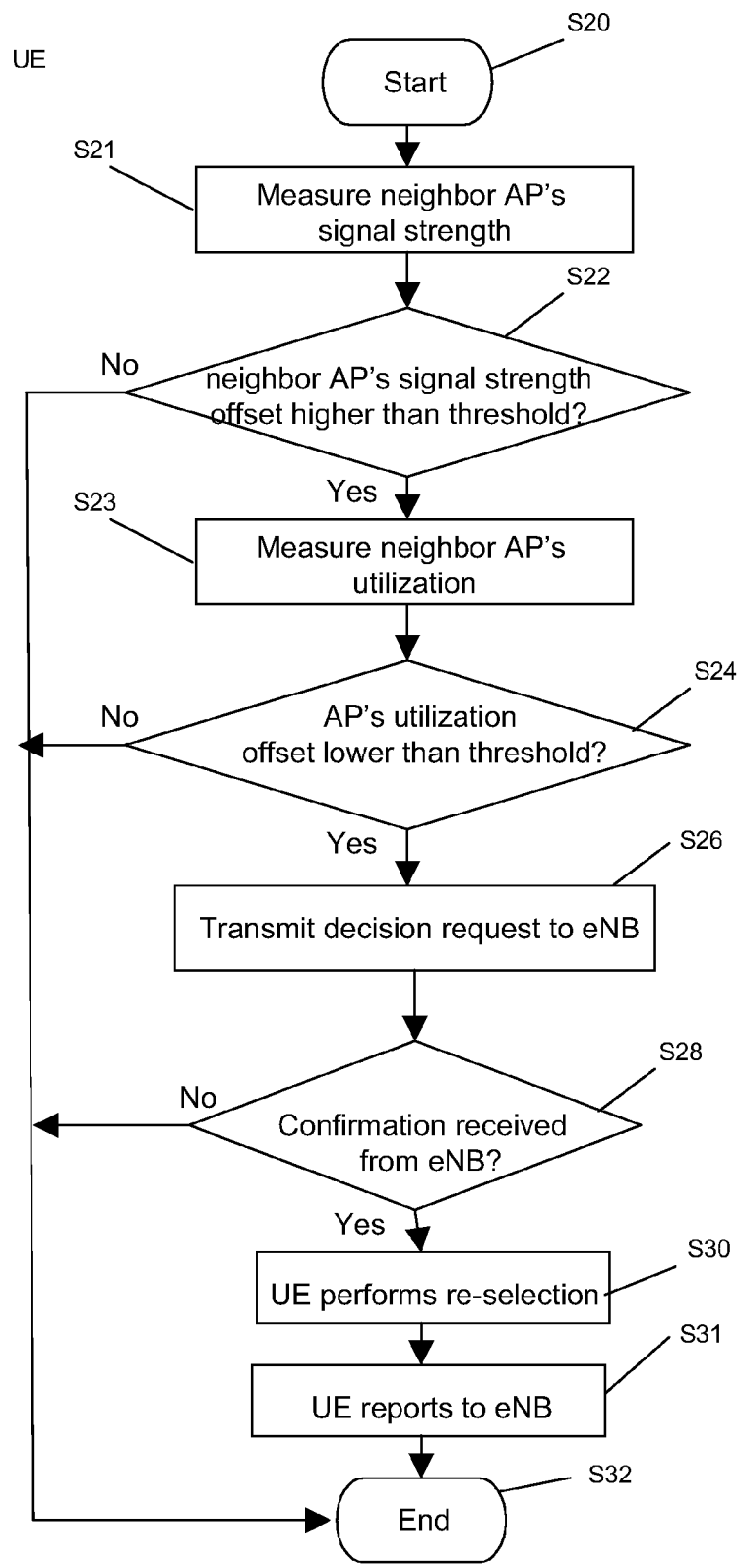
FIG. 2 shows schematically a flow chart for an operation executed by a terminal apparatus according to an exemplary embodiment of the invention dealing with access point re-selection.

A scenario for re-selection is depicted schematically according to the flow chart of FIG. 2 as an exemplary embodiment. The process start at step S20, where the user equipment UE is already communicating with a network device 30 or apparatus, respectively, via an access unit such as the user equipment UE2 and the access point AP1 according the embodiment of FIG. 4. The process proceeds with step S22 by determining whether the neighboring access unit signal strength is offset higher than a threshold, that is an access unit signal strength threshold. Applied to the embodiment of FIG. 4, it is determined whether the neighboring access point AP2 signal strength is offset higher than the threshold. This threshold can be predefined by the network device 30. If no, the process ends at step S32.

If yes, the process continues at step S24 by determining whether the neighboring access unit utilization is offset lower than a threshold, that is an access unit utilization threshold. This threshold can be predefined by the network device 30, too. Applied to the embodiment of FIG. 4, it is determined whether the neighboring access point's AP2 utilization is offset lower than the threshold. If no, the process ends at step S32.

If yes, the process continues at step S26 by transmitting a decision request to the network device 30 in order to receive confirmation for performing re-selection. The process continues at step S28.

At step S28, it is determined whether a confirmation for re-selection has been received by the user equipment UE. If no, the process ends at step S32. If yes, the process continues with step S30 by performing re-selection. Next, at step S31, the user equipment UE reports the re-selection to the eNB. Applied to the embodiment of FIG. 4, the user equipment UE2 swaps communication from the access point AP1 to the access point AP2. Then, the process ends at step S32.

Figure 3:
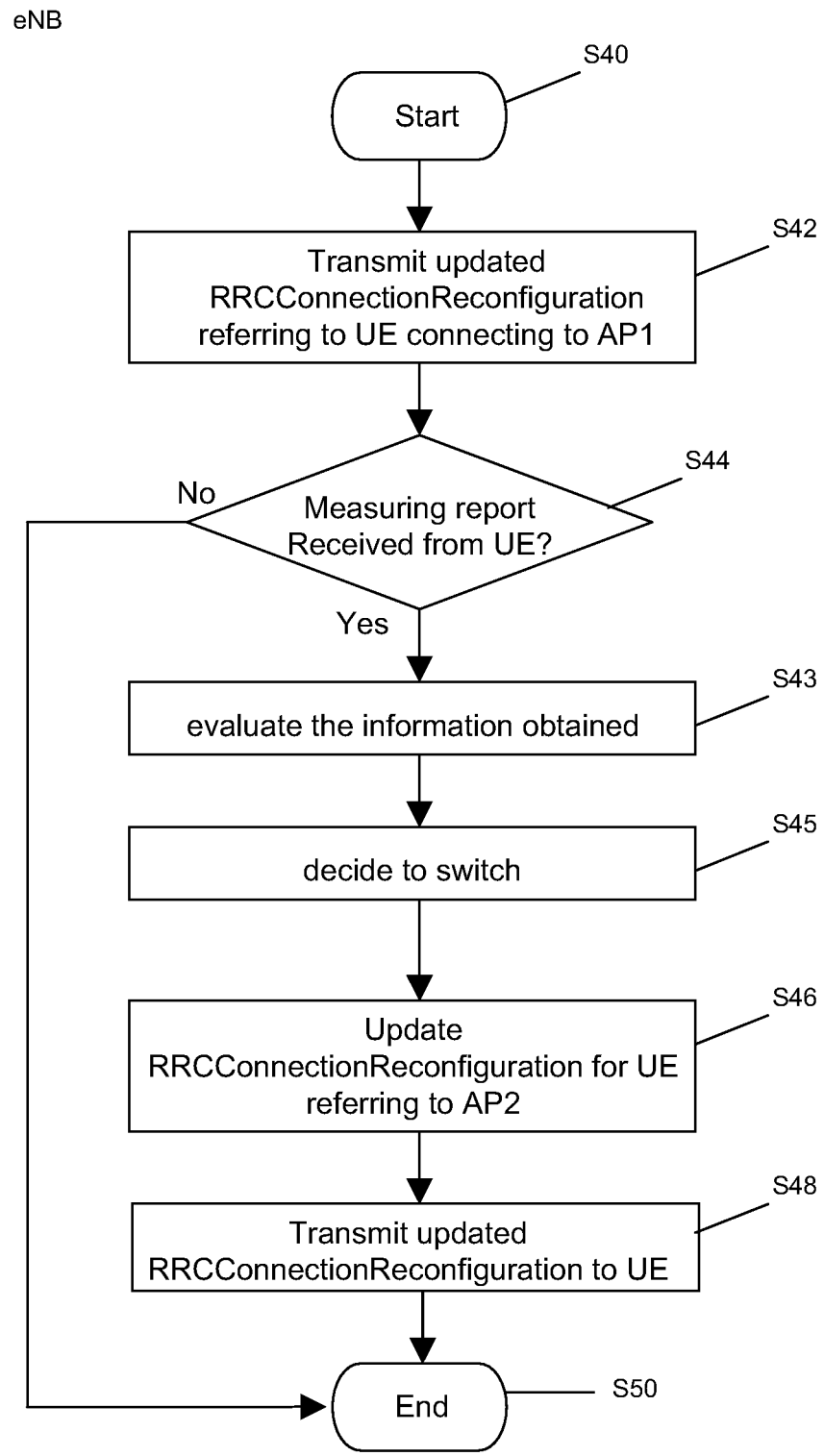
FIG. 3 shows a flow chart for an operation executed by a network apparatus according to an exemplary embodiment of the invention dealing with access point re-selection.

FIG. 3 shows schematically as an exemplary embodiment a flow chart for a network controlled access network mobility and selection. The process starts at step S40, wherein the network device 30, namely, the eNB, is in communication link with the user equipment UE via the first transmission resource which is present a licensed band used for LTE. At step S42, the network device 30 transmits an updated RRCConnectionReconfiguration signal to the user equipment UE, in order to achieve shifting the communication traffic from the first transmission resource to the second transmission resource. Preferably, the RRCConnectionReconfiguration signal contains assistant information such as the access point's AP address, e. g. AP1's address, beacon information, and also measurement configuration for the second transmission resource. This RRCConnectionReconfiguration signal requests the user equipment UE to monitor its communication range in view of access points available via the second transmission resource, preferably WLAN, such as e. g. the access points AP1 and AP2 for the user equipment UE2 or the access points AP1 for the user equipment UE1 in FIG. 4. The user equipment UE may perform a process such as described in relation to FIG. 1, in order to detect access points which come into consideration.

The process continues with step S44 by determining whether a measuring report has been received from the user equipment UE. If no, the process ends at step S50.

If yes, the process continues with step S46 by updating the RRCConnectionReconfiguration. For the purpose, the measurement report of the user equipment UE is evaluated and decision is made which access point is to be connected to. Applied to the embodiment of FIG. 4, access point AP2 is selected. The updated RRCConnectionReconfiguration signal is then transmitted to the user equipment UE at step S48. In response thereto, the user equipment UE will connect to the selected access point and proceed communication over this access point. Finally, the process ends at step S50. So, the respective communication traffic is shifted from the first transmission resource to the second transmission resource.

Considering the embodiment of FIG. 4, the user equipment UE2 finds the access point's AP1 utilization above the configured threshold, that is, there is too many traffic under access point's AP1, and, at the same time, access point's AP2 beacon signaling strength is offset-stronger than access point's AP1 beacon signaling strength. After receiving user equipment's UE2 measurement report for 802.11, eNB will issue an updated RRCConnectionReconfiguration to request the user equipment UE2 to access to the access point AP2.

According to one exemplary embodiment, the measurement executed by the user equipment UE related to the second transmission resource, here WLAN or WiFi, respectively, includes new information elements, namely, a new measObject802.11 and a new ReportConfig802.11 that are useable for network controlled access network mobility and selection.

Figure 8:
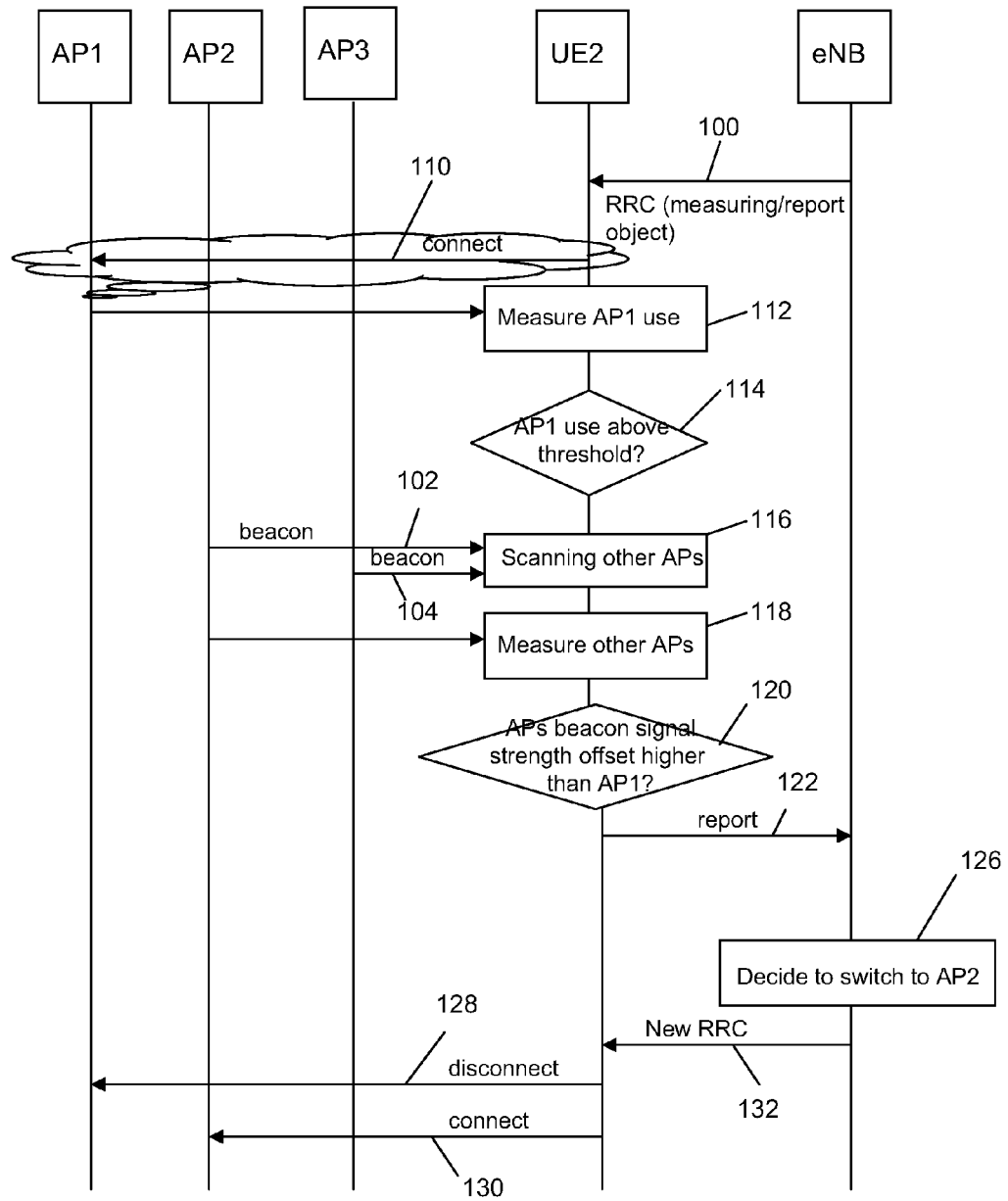
FIG. 8 schematically a signaling diagram of an exemplary embodiment of the invention.

Another exemplary embodiment of the invention related to the signaling is schematically shown in FIG. 8. In an upper portion of the FIG. 8, there depicted three access points AP1, AP2, Ap3, a user equipment UE2, and a an eNB in horizontal direction. A vertical direction corresponds to the proceeding time. The signaling according to FIG. 8 relates to network-controlled re-selection/handover. As can be seen from FIG. 8, the eNB transmits 100 a RRC to a user equipment UE2. The RRC includes a measuring object and/or a report object. Upon receipt of the RRC by the user equipment UE2 and evaluating information contained therein, the user equipment UE2 connects 110 to the access point AP1. In an alternate embodiment, the user equipment UE2 is connected to the access point AP1 before receiving the RRC.

Upon an event specified in the RRC, the user equipment UE2 starts measuring 112 a utilization of the access point AP1. If the utilization of the access point AP1 is above a threshold 114 which is preferably contained in the RRC, the user equipment UE2 will scan 116 its communication range for other access points AP2, AP3. Scanning preferably considers receiving of beacon signals 102, 104 of the related access points.

After having detected suitable access points AP2, the user equipment UE2 measures 118 an operational parameter of the access point AP2. Then, the user equipment UE2 determines whether the AP2's beacon signaling strength is offset higher than that of the access point AP1 at 120. If it is higher, it is reported 122 to the eNB. In an alternate embodiment, the report includes evaluation information such as e. g. gained at 114 or 120.

The eNB receives the report from the user equipment UE2. Then, the eNB decides 126 that the user equipment UE2 shall switch its communication to the access point AP2. The eNB sends a new RRC 132 to the user equipment UE2 containing the decision and requesting the user equipment UE2 to perform respective switching. In turn, the user equipment UE2 disconnects 128 from the access point AP1 and connects 130 to the access point AP2 in order to having performed switching.

Figure 9:
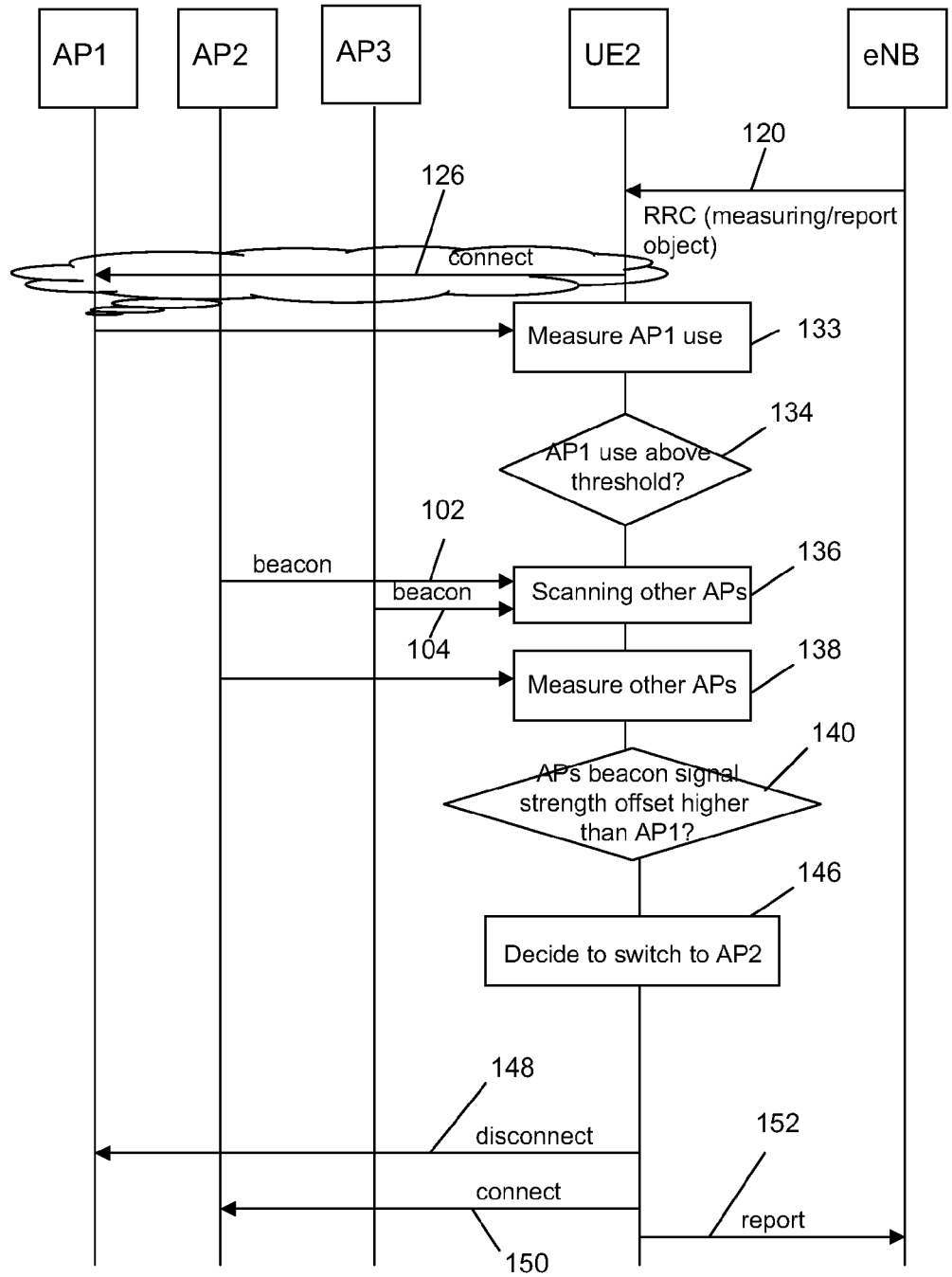
FIG. 9 schematically a signaling diagram of a further exemplary embodiment of the invention.

Another exemplary embodiment of the invention related to the signaling is schematically shown in FIG. 9. In an upper portion of the FIG. 9, there depicted three access points AP1, AP2, Ap3, a user equipment UE2, and a an eNB in horizontal direction. A vertical direction corresponds to the proceeding time. The signaling according to FIG. 9 relates to network-controlled re-selection/handover. As can be seen from FIG. 9, the eNB transmits 120 a RRC to a user equipment UE2. The RRC includes a measuring object and/or a report object. Upon receipt of the RRC by the user equipment UE2 and evaluating information contained therein, the user equipment UE2 connects 126 to the access point AP1. In an alternate embodiment, the user equipment UE2 is connected to the access point AP1 before receiving the RRC.

Upon an event specified in the RRC, the user equipment UE2 starts measuring 133 a utilization of the access point AP1. If the utilization of the access point AP1 is above a threshold 134 which is preferably contained in the RRC, the user equipment UE2 will scan 136 its communication range for other access points AP2, AP3. Scanning preferably considers receiving of beacon signals 122, 124 of the related access points.

After having detected suitable access points AP2, the user equipment UE2 measures 138 an operational parameter of the access point AP2. Then, the user equipment UE2 determines whether the AP2's beacon signaling strength is offset higher than that of the access point AP1 at 140. If it is higher, then the user equipment UE2 decides 146 to switch the communication from the access point AP1 to the access point AP2.

In turn, the user equipment UE2 disconnects 148 from the access point AP1 and connects 150 to the access point AP2 in order to having performed switching. Finally, this is reported 152 to the eNB.

According to a further embodiment, a new measurement object is proposed for eNB to request UE to measure WLAN. The new measurement object, e. g. measObject802.11, could include 2.4G, 5G, White Space channels, etc. According to an exemplary embodiment, several new measurement report triggering events are proposed to trigger measurement reports regarding to LTE/WLAN radio interworking, such as e. g.:

a. New event #c1: serving AP's signaling strength is stronger than a threshold.
b. New event #c2: serving AP's signaling strength is lower than a threshold.
c. New event #c3: serving AP's utilization is lower than a threshold.
d. New event #c4: serving AP's utilization is higher than a threshold.
e. New event #c5: AP#1's signaling strength is offset-better than AP2's signaling.
f. New event #c6: AP#1's signaling strength is offset-worse than AP2's signaling.

Accordingly, a new reporting configuration, e. g. ReportConfig802.11, is proposed to indicate these events regarding to LTE/WLAN radio interworking.

Furthermore, a new measurement result, e. g. MeasResults802.11, is proposed to include the measurement results regarding to LTE/WLAN radio interworking.

According to a further exemplary embodiment, for user equipment UE autonomous access network mobility and selection, a new information element (IE) is proposed to be added in the RRCConnectionReconfiguration to configure user equipment UE autonomous access point AP re-selection/handover parameters such as access point AP utilization threshold, access point AP signal strength threshold, offsets, SSID, etc.

According to one exemplary embodiment, an information element is a MeasObjectToAddModList. The information element IE MeasObjectToAddModList concerns a list of measurement objects to add or modify. This information element can be as follows:

A MeasObjectToAddModList information element that forms an exemplary embodiment of the invention is shown in the following listing:

```
-- ASN1START
MeasObjectToAddModList ::=        SEQUENCE (SIZE
                                  (1..maxObjectId)) OF
MeasObjectToAddMod
MeasObjectToAddMod ::= SEQUENCE {
    measObjectId                  MeasObjectId,
    measObject                    CHOICE {
        measObjectEUTRA           MeasObjectEUTRA,
        measObjectUTRA            MeasObjectUTRA,
        measObjectGERAN           MeasObjectGERAN,
        measObjectCDMA2000        MeasObjectCDMA2000,
        measObject802.11          MeasObject802.11,
        ...
    }
}
-- ASN1STOP
```

The measObject802.11 is added to the information element MeasObjectToAddModList and causes to provide corresponding measurement.

According to a further exemplary embodiment, an information element is the information element IE MeasObject802.11 which specifies information applicable for 802.11 networks.

Correspondingly, a MeasObjectEUTRA information element that forms an exemplary embodiment of the invention and contains additionally channellList802.11 is shown in the following listing:

```
-- ASN1START
MeasObjectEUTRA ::=       SEQUENCE {
    802.11Version             802.11version,
    carrierFreq802.11             CarrierFreq802.11,
    timeOffsetFreq                INTEGER (0..15)       OPTIONAL, --
Need ON
    measWindowSize                INTEGER (0..15)       OPTIONAL, --
Need ON
    aP-MACAddressList             AP-MACAddressList     OPTIONAL, --
Need ON
    channel1List802.11            ChannelList802.11     OPTIONAL, --
Need ON
}
802.11version :: = INTEGER (1..16)
CarrierFreq802.11 :: = INTEGER (1..4)
APMACAddressList :: = SEQUENCE (SIZE (1..maxAPMeas)) OF
APMACAddress
ChannelList802.11 :: = INTEGER (1..52)
-- ASN1STOP
```

Yet a further exemplary embodiment relates to an information element IE ReportConfigToAddModList which concerns a list of reporting configurations to add or modify.

A ReportConfigToAddModList information element that forms an exemplary embodiment of the invention and contains additionally reportConfig802.11 is shown in the following listing:

```
-- ASN1START
ReportConfigToAddModList ::=    SEQUENCE (SIZE
                                (1..maxReportConfigId))
OF ReportConfigToAddMod
```

Event C2: serving AP's signaling is lower than a threshold.

Event C3: serving AP's utilization is lower than a threshold.

Event C4: serving AP's utilization is higher than a threshold.

Event C5: AP#1's signaling is offset-stronger than AP2's signaling.

Event C6: AP#1's signaling is offset-smaller than AP2's signaling.

A ReportConfig802.11 information element that forms an exemplary embodiment of the invention is show in the following listing:

```
-- ASN1START
ReportConfig802.11 ::=                          SEQUENCE {
    triggerType                                     CHOICE {
        event                                           SEQUENCE {
            eventId                                         CHOICE {
                eventC1                                         SEQUENCE {
                    c1-Threshold                                    CHOICE {
                        c1-Threshold802.11                              Threshold802.11,
                    }
                },
                eventC2                                         SEQUENCE {
                    c2-Threshold                                    CHOICE {
                        c2-Threshold802.11                              Threshold802.11,
                    }
                },
                ...,
            },
            timeToTrigger                                   TimeToTrigger
        },
        periodical                                      SEQUENCE {
            purpose                                         ENUMERATED {
                                                                reportStrongestAPs,
reportIdleAPs}
            }
        },
    }
}
-- ASN1STOP
MeasResult802.11 ::=    SEQUENCE {
    aPMACAddress                                    APMACAddress,
    measResult                                      SEQUENCE {
        beaconStrength                                  INTEGER (0..15) OPTIONAL, --
Need ON
        rSSI                                            INTEGER (0..15) OPTIONAL, --
Need ON
        occupationRatio                                 INTEGER (0..15) OPTIONAL, --
Need ON
    }
}
```

-continued

```
ReportConfigToAddMod :: = SEQUENCE {
    reportConfigId              ReportConfigId,
    reportConfig                CHOICE {
        reportConfigEUTRA           ReportConfigEUTRA,
        reportConfigInterRAT        ReportConfigInterRAT,
        reportConfig802.11          ReportConfig802.11
    }
}
-- ASN1STOP
```

Still a further exemplary embodiment relates to an information element IE ReportConfig802.11 which specifies criteria for triggering of an 802.11 measurement reporting event. The 802.11 measurement reporting events are labeled continuous numbers CN with N equal to 1, 2 and so on. For instance:

Event C1: serving AP's signaling is stronger than a threshold.

In an exemplary embodiment, the second resource 20 is a radio based resource, especially, e. g. an ISM band, preferably, the 2.4 GHz band as useable for WLAN services or the like. However, the second source may also differ hereof, e. g. by infrared light, ultrasonic, or the like, wherein the invention can similarly applied. The first resource 18 may be a licensed radio band such as LTE, UMTS, GSM or the like. However, it may also be a differing resource such as infrared light, ultrasonic, or the like. Both of the resources are provided for wireless communication.

Advantage:

The invention can provide efficient access network mobility and selection for WLAN/3GPP interworking.

As used in this application, the terms "unit", "module", "processing system", and "circuitry" refer to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition applies to all uses of those terms in this application, including in any claims.

As a further example, as used in this application, the terms "unit", "module", "processing system", and "circuitry" would also cover an implementation of merely a processor (or multiple processors) or portion of a processor and its (or their) accompanying software and/or firmware. The terms "unit", "module", "processing system", and "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions and/or embodiments may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims. Especially, the embodiments described may be combined in various manners so as to adapt the invention to individual requirements without departing from the scope of the invention.

It is also noted herein that, while the above describes example embodiments of the invention, these descriptions should not be viewed in a limiting sense. Rather, there are several variations and modifications which may be made without departing from the scope of the present invention as defined in the appended claims.

LIST OF ACRONYMS

AP: Access Point
C-RNTI: Cell Radio Network Temporary Identity
DL: Downlink
eNB: Enhanced Node B.
GSM: Global System for Mobile Communications
IP: Internet Protocol
ISM: Industrial, Scientific and Medical band
LTE: Long Term Evolution
LTE-A: Long Term Evolution Advanced
MAC: Media Access Control
MME: Mobility Management Entity
QoS: Quality of Service
RRC: Radio Resource Control
SAE: Society of Automotive Engineers
SIP: Session Initiation Protocol
UE: User Equipment
UL: Uplink
WLAN: Wireless Local Access Network

What is claimed is:

1. An apparatus, comprising:
   a control circuit configured to
      control a transceiver to use a first transmission resource for direct communication with an apparatus of a first type and a second transmission resource communication with one of plural apparatuses of a second type each linked to the apparatus of the first type,
      receive a radio resource control (RRC) message from the apparatus of the first type via the first transmission resource, the RRC message including at least a utilization threshold of one of the apparatuses of the second type,
      in response to receipt of the RRC message, determine whether communication with the one of the plural apparatuses of the second type via the second transmission resource is established, and,
      in response thereto, obtain information for deciding whether to switch to communication with another one of the apparatuses of the second type via the second transmission resource,
      evaluate the information obtained, and,
      cause to decide to switch to communication with the other one of the apparatuses of the second type via the second transmission resource based on the evaluation of the information obtained.

2. The apparatus according to claim 1, wherein the decision to switch to communication with the other one of the apparatuses of the second type via the second transmission resource is caused by the control circuit in an autonomous mode.

3. The apparatus according to claim 1, wherein the control circuit is configured to, in a non-autonomous mode,
   report the information obtained to the apparatus of the first type via communication through the first transmission resource, and
   receive, from the apparatus of the first type via the first transmission resource, a decision to switch to communication with the other one of the apparatuses of the second type in order to decide to switch to communication with the other one of the apparatuses of the second type via the second transmission resource.

4. The apparatus according to claim 1, wherein the control circuit is further configured to,
   in order to obtain the information, cause measuring of an operational parameter of apparatuses of the second type which are in a communication range.

5. The apparatus according to claim 2, wherein the control circuit is configured to
   receive a configuration indicative of at least the autonomous mode or the non-autonomous mode.

6. The apparatus according to claim 4, wherein the control circuit is configured to
   report respective operational parameters measured to the apparatus of the first type via the first transmission resource.

7. The apparatus according to claim 1, wherein the control circuit is configured to
   report switching to communication with the other one of the apparatuses of the second type to the apparatus of the first type.

8. The apparatus according to claim 5, wherein the configuration comprises at least one of an address of the other one of the apparatuses of the second type, a beacon information, a measurement configuration for the second transmission resource, a signal strength threshold of the other one of the apparatuses of the second type, a utilization threshold of the other one of the apparatuses of the second type, offset, and an identification signaling of the other one of the apparatuses of the second type.

9. A method, comprising:
controlling a transceiver of an first apparatus to use a first transmission resource for direct communication with a second apparatus of a first type, and a second transmission resource for communication with one of plural third apparatuses of a second type each linked to the second apparatus of the first type,
receiving a radio resource control (RRC) message from the apparatus of the first type via the first transmission resource, the RRC message including at least a utilization threshold of one of the apparatuses of the second type;
in response to receipt of the RRC message, determining whether communication between the first apparatus and the one of the plural third apparatuses of the second type via the second transmission resource is established, and,
in response thereto, obtaining information for deciding whether to switch to communication with another one of the third apparatuses of the second type via the second transmission resource,
evaluating the information obtained, and,
deciding to switch to communication with the other one of the third apparatuses of the second type via the second transmission resource based on the evaluation of the information obtained.

10. The method according to claim 9, wherein the decision to switch to communication with the other one of the third apparatuses of the second type via the second transmission resource is caused by a control circuit of the first apparatus while in an autonomous mode.

11. The method according to claim 9, comprising, in a non-autonomous mode:
reporting the information obtained to the second apparatus of the first type via the first transmission resource, and
receiving, from the second apparatus of the first type and via the first transmission resource, a decision to switch to communication with the other one of the third apparatuses of the second type in order to decide to switch to communication to the other one of the third apparatuses of the second type via the second transmission resource.

12. The method according to claim 9, further comprising, in order to obtain the information, causing measuring of an operational parameter of third apparatuses of the second type which are in a communication range.

13. The method according to claim 10, comprising receiving a configuration indicative of at least the autonomous mode or the non-autonomous mode.

14. The method according to claim 12, comprising causing to report respective operational parameters measured to the second apparatus of the first type.

15. The method according to claim 9, comprising reporting switching the communication to the other one of the third apparatuses of the second type to the second apparatus of the first type.

16. The method according to claim 13, wherein the configuration comprises at least one of an address of the other one of the third apparatuses of the second type, a beacon information, a measurement configuration for the second transmission resource, a signal strength threshold of the other one of the third apparatuses of the second type, a utilization threshold of the other one of the third apparatuses of the second type, offset, and an identification signaling of the other one of the third apparatuses of the second type.

17. A non-transitory computer readable medium comprising a set of instructions, which, when executed on an apparatus, causes the apparatus to perform the steps of the method according to claim 9.

18. The apparatus according to claim 1, wherein the first transmission resource includes a licensed band, and the second transmission resource includes an unlicensed band.

* * * * *